Oct. 1, 1963  P. P. RICHARD  3,105,705
COUPLING ARRANGEMENT BETWEEN A HALF-TRAILER AND A TRACTOR
Filed Dec. 7, 1961  2 Sheets-Sheet 2
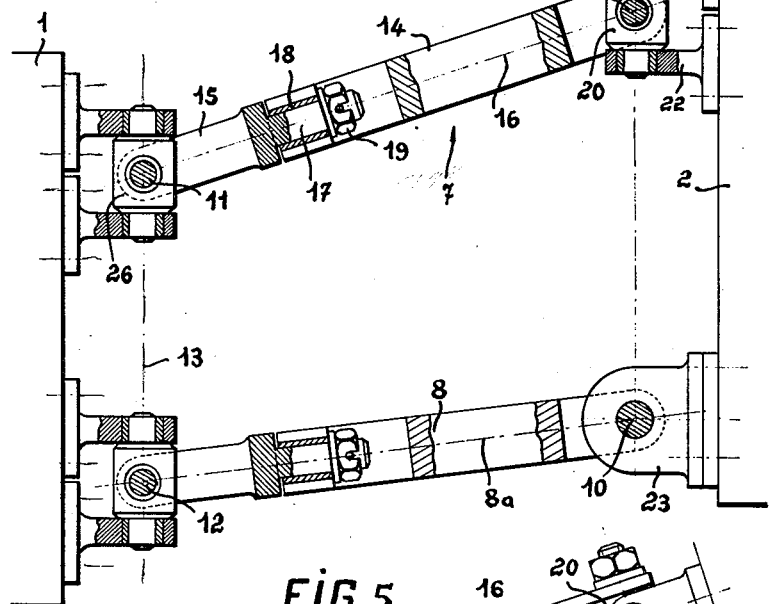
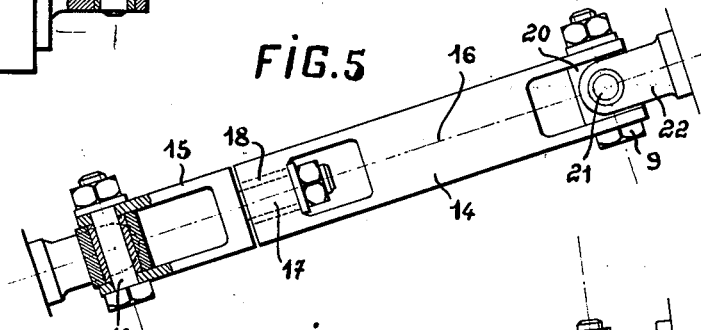
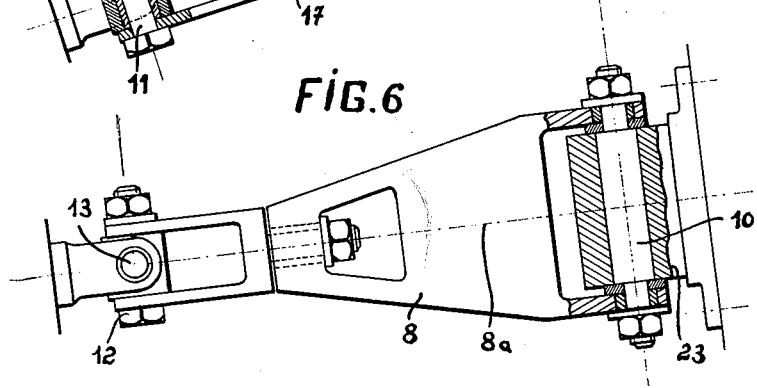
INVENTOR
BY
ATTORNEY United States Patent Office 3,105,705
Patented Oct. 1, 1963

3,105,705
COUPLING ARRANGEMENT BETWEEN A HALF-
TRAILER AND A TRACTOR
Paul Pierre Richard, Rte. De Saint-Fortunat,
Saint-Cyr, France
Filed Dec. 7, 1961, Ser. No. 157,799
Claims priority, application France Dec. 15, 1960
2 Claims. (Cl. 280—461)

My invention has for its object an arrangement for coupling a half-trailer with the rear of a tractor in a manner such that the load transmitted by the trailer to the axles of the tractor may be distributed between said axles in an optimum manner.

My improved coupling system allows, for instance, in the case of a tractor provided with two axles, subdividing the transferred load into two equal fractions applied respectively to each of the tractor axles. It is possible also to design the coupling in a manner such that the load carried by the half-trailer including its load when empty and transferred onto the tractor, may be distributed between the two axles of the tractor in any other predetermined ratio.

I have illustrated, by way of example, in the accompanying drawings, a preferred embodiment of my invention. In said drawings:

FIG. 4 is an elevational sectional view of my improved coupling arrangement.

FIG. 5 is a plan view, partly sectional, of the upper arm of the coupling arrangement according to FIG. 4.

FIG. 6 is a plan view, partly sectional, of the lower arm of the coupling arrangement according to FIG. 4.

Figure 1:
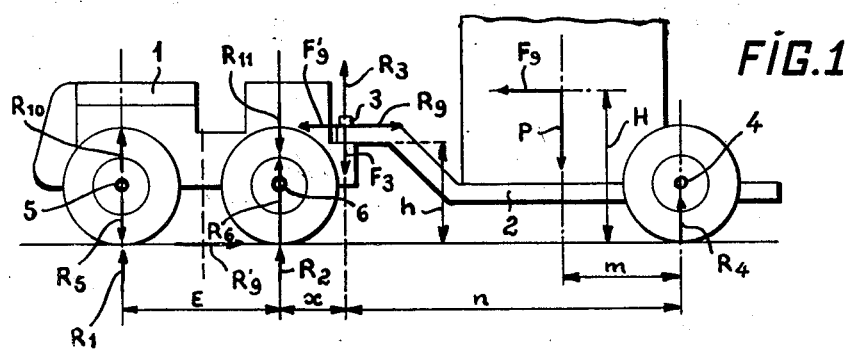
FIG. 1 is a diagrammatic elevational view of a tractor coupled conventionally with a half-trailer.

In order to allow my invention to be better understood, there is illustrated in FIG. 1 a tractor with two axles, followed by a half-trailer coupled conventionally with the tractor. In this case, the connection between the tractor 1 and the half-trailer 2 is obtained round a vertical geometrical axis 3, which allows the tractor and trailer system to follow a predetermined curve. Said geometrical axis is, in a practical embodiment, formed by a pivot adapted to absorb the component of the load carried by the trailer, together with the tractional or braking stresses, said pivot being also designed so as to allow the relative movements between the half-trailer and the tractor round longitudinal and transverse axes.

With the tractor and the half-trailer standing on horizontal ground as shown in FIG. 1, the weight P of the half-trailer and of its useful load is balanced, on the one hand, by the reaction $R_4$ exerted vertically by the ground in vertical registry with the trailer axle 4 and, on the other hand, by the vertical reaction $R_3$ passing through the axis of the pivot 3.

Assuming $m$ designates the distance between the center of gravity of the system including the half-trailer and its useful load and the rear axle 4 and $n$ designates the distance between said rear axle 4 and the pivotal axis 3, the value of the reaction $R_3$ is defined perfectly; the sign + being used for the forces and reactions directed downwardly:

$$R_3 = -\frac{Pm}{n}$$

The tractor is subjected, in registry with the pivot, to a load $F_3$ equal and opposed to $R_3$, $$R_3 = +\frac{Pm}{n}$$

The force $F_3$ is, in its turn, balanced by the two reactions $R_5$ and $R_6$ exerted by the ground in vertical registry with the front and rear axles of the tractor, respectively shown at 5 and 6. Said reactions are also perfectly defined as functions of the distance $x$ between the pivot 3 and the rear tractor axle 6 and of the wheel base $E$ of the tractor:

$$R_5 = F_3\frac{x}{E} = P\frac{m}{n}\frac{x}{E}$$

$$R_6 = -F_3\frac{E+x}{E} = -P\frac{m}{n}\frac{E+x}{E}$$

The signs adopted arbitrarily show $R_5$ is positive and corresponds to a reaction acting downwardly on the tractor. It is therefore to be subtracted from the reaction $R_1$ which balances the component of the weight of the tractor considered alone, on its front axle.

In contradistinction, the reaction $R_6$ is negative and is therefore directed upwardly and is to be added to the reaction $R_2$ corresponding to the actual weight of the tractor acting on its rear axle.

The bearing of the half-trailer 2 on the tractor 1 which is exerted on a pivot such as 3 to the rear of the rear tractor axle 6, has thus for its result to reduce the load on the front tractor axle 5 and to overload the rear axle 6 of the tractor.

The loads on the front and rear axles of the tractor respectively are thus subjected to opposite modifications by the weight of the half-trailer and of the useful load carried by the latter. Since the tractor should be capable of operating sometimes alone and sometimes with the half-trailer, the load on which is furthermore of a variable character, the consequence is that the tractor must operate with loads varying in reverse directions on its two axles; the load on the front axle being reduced when the load increases, whereas the load on the rear axle increases with said load.

This is a serious drawback which constrains to make the front axle such as 5 carry a high load under empty conditions, so that, in spite of the relieving action provided by the reaction $R_5$, the resultant load on said front axle $R_5+R_1$ remains negative when the half-trailer is coupled with the tractor. A positive value of this resultant load would correspond, in fact, to a rising of the front axle 5.

Similarly, the overload produced by the half-trailer on the rear tractor axle leads to an oversizing of the rear axle 6 and of the tires supporting the latter.

The opposite direction of the reactions exerted on the front and rear tractor axles 5 and 6 by the half-trailer has a more serious drawback in the case where the axles 5 and 6 are both driving axles. As a matter of fact, this modification in load leads to modifications in opposite directions of the sagging under load and, consequently, in the operative radii of the front and rear tires.

This results in that the theoretical paths along which the front and the rear wheels run for each revolution of said wheels, vary with the load and this implies longitudinal sliding movements of the tires with reference to ground. These longitudinal sliding movements have for their result to destroy the driving adherence and, therefore, to limit the possible performances of the tractor, chiefly over a ground showing a poor adherence, which leads to a speedy wear of the tires, while a fraction of the power is lost unnecessarily.

In order to cut out or at least to reduce such drawbacks, it has been proposed to position the pivot 3 between the two axles 5 and 6 of the tractor, preferably at the middle point of the wheel base E. This solution, which is theoretically excellent, meets numerous difficulties in its actual execution. On the one hand, the medial section of the tractor generally carries mechanical transmitting members and, on the other hand, it is necessary to connect, in such a case, the half-trailer to the pivot by means of a very long arm adapted to resist the stresses and torques resulting therefrom and, furthermore, said arm should be capable of being shifted round the pivot 3 thus positioned near the center of the tractor, so as to allow the tractor and half-trailer to move along a curve without any contact between said arm and the tractor parts lying near it or the wheels.

In most cases, such a solution is clearly impossible. It is also necessary to consider the action of the inertia force $F_9$ which is parallel with the ground and which appears upon braking of the tractor. Said force is balanced by a reaction $R_9$ in the coupling, which leads to the production of a torque of a value $F_9 (H-h)$, H being the height of the center of gravity of the system including the half-trailer and its useful load, while $h$ is the height of the coupling above ground. Said torque is, in its turn, balanced by two vertical reactions which are equal and of opposite directions and are exerted on the axle 4 of the trailer and on the pivot 3 of the tractor, respectively, which modifies $R_5$ and $R_6$.

To the reaction $R_9$, there corresponds furthermore a force $F'_9$ equal to $F_9$ and applied to the tractor. This force $F'_9$ is balanced by a horizontal reaction $R'_9$ applied to the braked wheels of the tractor and it leads to the formation of a torque $F_9 \times h$ applied to the tractor. This latter torque is balanced by two vertical reactions of opposite directions $R_{10}$ and $R_{11}$ applied in registry with the axles 5 and 6 of the tractor and the value of which is:

$$R_{11} = -R_{10} = \frac{F_9 h}{E}$$

These reactions correspond to an increase in load on the front axle and to a reduction of the load on the rear axle. It is apparent that they increase when $h$ increases. It is often difficult to reduce $h$ if it is desired to retain a sufficient spacing with reference to ground.

My invention has for its object a coupling system which eliminates the above-disclosed drawbacks.

Figure 2:
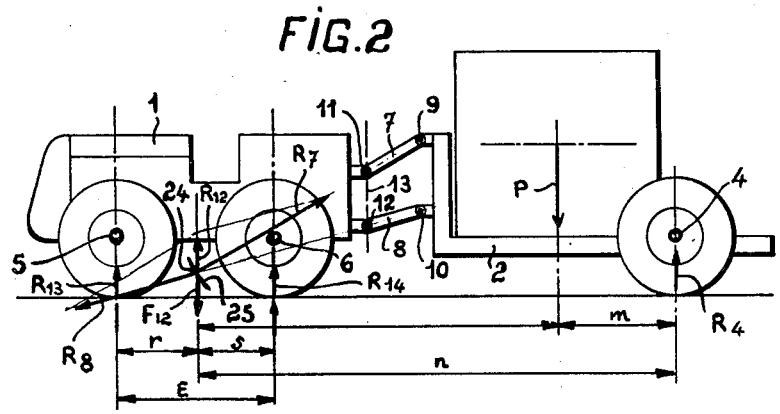
FIG. 2 is a diagrammatic elevational view of a tractor coupled with a half-trailer through the agency of my improved arrangement.

FIG. 2 illustrates diagrammatically a coupling of a half-trailer 2 with a tractor 1.

According to my invention, said coupling includes two connecting rods 7 and 8 connecting the tractor with the half-trailer. These connecting rods are pivotally secured to the trailer round transverse horizontal axes 9 and 10 and to the tractor round transverse horizontal axes 11 and 12. Furthermore, said pivotal connections with the tractor at 11 and 12 are designed so as to allow a rocking of the connecting rods 7 and 8 round a substantially vertical geometrical axis 13, whereby the system including the tractor and the half-trailer may follow any predetermined curve.

In other words, the pivotal connections 11 and 12 are designed so as to allow both the rotation of the two connecting rods 7 and 8 round a common axis 13 which is vertical or slightly sloping and the rotation of each of said connecting rods 7 and 8 round its own transverse axis 11 or 12. The slope of the axis 13 with reference to a vertical line may serve for producing a path-stabilizing torque.

The pivotal connection between the connecting rods and the half-trailer 2 may be produced by means of simple transverse horizontal spindles 9 and 10. It is of advantage however, if the system including the tractor and the half-trailer is to run over uneven ground, as is usually the case, to add supplementary pivotal connections adapted to prevent any twisting stress from arising in the connecting rods. These further supplementary connections may be constituted as illustrated, by way of example, in FIGS. 4, 5 and 6.

In said figures, the upper connecting rod 7 is formed of two sections 14 and 15 which are pivotally secured together so as to be rotatable with reference to each other round the axis 16 of the connecting rod. The pivotal connection is formed in practice by a pivot 17 rigid with the section 15 and adapted to rotate inside a cylindrical bearing 18 rigid with the part or section 14. A nut 19 ensures the connection in an axial direction between the two sections 14 and 15. The section 14 is rotatable round the horizontal spindle 9 carried by a member 20 which is adapted to rotate in its turn round a vertical spindle 21, the latter being rotatably supported in part 22 which is rigid with the half-trailer 2. Similarly, the section 15 is rotatable round the horizontal spindle 11 with reference to a member 26 adapted to rotate round the vertical axis 13 with reference to the tractor.

The lower connecting rod 8 is also made of two sections pivotally secured so as to allow relative rotation with reference to each other round the axis $8a$. The section facing the tractor is mounted in a manner identical with the mounting of the section 15 of the upper connecting rod 7, whereas its section facing the half-trailer is simply mounted so as to rotate round the horizontal transverse spindle 10 with reference to a member 23 rigid with the half-trailer 2.

The connecting rods 7 and 8 are arranged in a manner such that their geometrical axes passing respectively through the axes of the spindles 9 and 10, on the one hand, and 10 and 12, on the other hand, may converge at a virtual point 24 located between the axles 5 and 6 of the tractor and, if desired, at equal distances between said axles.

This feature gives my improved arrangement particularly advantageous properties.

As a matter of fact, upon examination of FIG. 2, it is apparent that the weight P of the half-trailer and of its useful load is balanced, on the one hand, by a reaction $R_4$ in vertical registry with the rear axle 4 of the half-trailer and, on the other hand, by the different reactions arising in the connecting rods 7 and 8.

The rear axle 4 of the trailer can only produce a vertical reaction $R_4$, since the wheels carried by said axle are capable of rotating and, consequently, the resultant of the reactions produced by the two connecting rods 7 and 8 is necessarily vertical. By reason of the pivotal connection of the connecting rods at 11, 9, 12 and 10, said resultant $R_{12}$ of the reactions produced by said connecting rods, passes of necessity through the point of convergence 24 of their geometrical axes.

The weight P of the half-trailer including its useful load is therefore balanced by the two vertical reactions $R_4$ and $R_{12}$ which face a direction opposed to P, which means they are negative.

The reaction $R_{12}$ can be resolved into two forces $R_7$ and $R_8$ extending along the corresponding connecting rods 7 and 8.

The reaction $R_{12}$ is defined by the equation:

$$R_{12} = -P\frac{m}{n}$$

$n$ being, in this case, the distance between the rear axle 4 of the half-trailer and the virtual point 24 of meeting of the geometrical axes of the connecting rods 7 and 8.

The tractor 1 is therefore subjected to a force $F_{12}$ applied to the point 24 and equal to $R_{12}$, but of an opposite direction.

Thus, the arrangement is the same as if the trailer were actually pivotally connected round an axis passing through the point 24 of the tractor.

The force $F_{12}$ applied to the tractor is balanced by two vertical reactions $R_{13}$ and $R_{14}$ (FIG. 2) passing through the corresponding tractor axles. Said reactions have respectively for their values:

$$R_{13} = -F_{12} \times \frac{s}{E} = -P\frac{m}{n}\frac{s}{E}$$

$$R_{14} = -F_{12} \times \frac{r}{E} = -P\frac{m}{n}\frac{r}{E}$$

$s$ and $r$ being the distances between the point 24 and respectively the rear axle 6 and the front axle 5 of the tractor.

Said reactions are equal if $s=r$, that is if the point 24 is located at equal distances from the axles 5 and 6.

It is always possible to satisfy said condition on a horizontal ground by suitably positioning the connecting points 9, 10, 11 and 12. During the relative movements produced by the longitudinal outline of the road or by the unevennesses of the ground, the four-link system constituted by the connecting rods 7 and 8, the axis 13 and the straight line connecting the pivotal connections at 9 and 10 is deformed and the point 24 moves over a curve 25 sloping with reference to a vertical line and thus implies modifications in the distances $r$ and $s$ and, consequently, modifications in the reactions $R_{13}$ and $R_{14}$. It is however important to remark that such modifications are of a limited character and that the point 24 remains sufficiently near the vertical line located at equal distances between the axles 5 and 6 for the relative modifications of $R_{13}$ and $R_{14}$ to remain small and even negligible with reference to those obtained in a conventional coupling, wherein the pivotal axis such as 3 (FIG. 1), is located to the rear of the rear axle or in the vicinity of the latter.

In the case where $$s = r = \frac{E}{2}$$

$$R_{13} = R_{14} = -P\frac{m}{2n}$$

Figure 3:
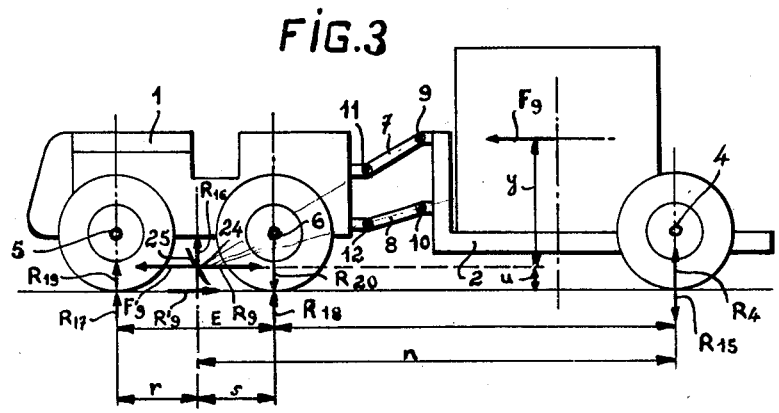
FIG. 3 is a view similar to FIG. 2, adapted to show certain properties of my improved arrangement as concerns horizontal stresses or, more generally, stresses which are parallel with the ground.

FIG. 3 illustrates the behavior of my improved coupling in the presence of stresses parallel to ground level such as $F_9$, as ascribable, for instance, to the braking of the tractor.

The force $F_9$ is balanced by the reaction exerted on the connecting rods. In the absence of any braking of the trailer axle 4, the reaction $R_4$ remains vertical and the resultant of the reactions transmitted by the connecting rods for balancing $F_9$ is a horizontal reaction $R_9$ parallel to $F_9$ and applied to the point 24 which is the meeting point of the geometrical axes of the connecting rods 7 and 8. This results in the application to the trailer of a torque $F_9 \times y$, $y$ being the difference between the levels of the center of gravity of the half-trailer including its useful load and of the virtual meeting point 24.

This torque is balanced by a resisting torque formed by a vertical reaction $R_{15}$ in registry with the rear trailer axle 4 and a virtual also vertical reaction $R_{16}$ applied to the meeting point 24.

This reaction $R_{16}$ is directed upwardly and corresponds to a load applied downwardly onto the tractor, i.e. to two negative reactions $R_{17}$ and $R_{18}$ applied to the axles 5 and 6 of said tractor.

The value of $R_{16}$ is equal to $$R_{16} = -F_9 \times \frac{y}{n}$$

and the reactions on the axles ascribable to the torque $F_9$ are respectively:

$$R_{17} = -F_9 \frac{y}{n}\frac{s}{E}$$

$$R_{18} = -F_9 \frac{y}{n}\frac{r}{E}$$

The above-referred to reaction $R_9$ corresponds to a force $F'_9$ applied to the tractor which is equal to and directed in opposition with $R_9$ and is therefore equal to $F_9$, and has the same direction as the latter. Said force is in its turn balanced by a reaction $R'_9$ applied by the ground to the system of braked axles of the tractor, which produces a torque $F_9 \times u$, $u$ being the vertical distance between the meeting point 24 and the ground.

This latter torque is balanced in its turn by two vertical reactions $R_{19}$ and $R_{20}$ which are equal and of opposite directions and which are applied respectively to the axles 5 and 6 of the tractor.

$$R_{19} = -F_9 \times \frac{u}{E}$$

$$R_{20} = +F_9 \times \frac{u}{E}$$

$R_{19}$ corresponds to an increase in load on the front axle 5 and $R_{20}$ to a reduction in the load applied to the rear axle 6.

The reactions ascribable to $F_9$ are respectively:

$$R_{17} + R_{19} = -F_9 \left( \frac{y}{n}\frac{s}{E} + \frac{u}{E} \right)$$

and on the rear axle 6:

$$R_{18} + R_{20} = -F_9 \left( \frac{y}{n}\frac{r}{E} - \frac{u}{E} \right)$$

The meeting point 24 being a virtual point, may be suitably positioned upon selection of the axes 9, 10, 11 and 12 in a manner such that for normal positioning on a flat ground, said point may lie on the ground, that is: $u=0$, which leads to $R_{19}=R_{20}=0$. If, furthermore, the meeting point 24 is at equal distances from the axles 5 and 6 of the tractor, $$s = r = \frac{E}{2}$$

and the reactions produced by the horizontal component of the force $F_9$ are:

$$R_{17} = R_{18} = -F_9 \frac{y}{2n}$$

As mentioned hereinabove, the meeting point 24 may move over an arcuate line such as 25 in FIG. 2, in correspondency with the modifications of the relative setting of the tractor and of the half-trailer. This implies slight modifications in the reactions exerted on the axles 5 and 6 of the tractor, but such modifications remain small and even negligible, with reference to those observed with a conventional coupling.

Obviously, instead of positioning the meeting point 24 at equal distances from the axles 5 and 6 of the tractor, it is possible to set the connecting rods 7 and 8 in a manner such that their virtual meeting point 24 may lie at distances $r$ and $s$ from the axles 5 and 6 which are no longer equal, if it is desired to obtain an unequal distribution of the reactions. Such a result may be searched for systematically in the case, for instance, where the tires equipping respectively the axles 5 and 6 are different and follow different laws of bending under the action of their load. Similarly, the height $u$ of the meeting point 24 above ground may be selected either positive or negative, instead of being zero, according to the desired result to be considered.

As concerns the nature of the pivotal connections of the connecting rods such as 7 and 8 with the tractor and half-trailer, other embodiments may be resorted to. The main feature of my invention consists chiefly in providing a convergence of the connecting rods at a predetermined point or on a predetermined geometrical locus, so that the resultant of the stresses passing through the connecting rods and ascribable to the vertical or horizontal stresses, may pass through a predetermined point or be located on a predetermined curve. The point of application of the said resultant governs the reactions on the axles of the tractor. The pivotal connections may, furthermore, be designed, if desired, in a manner such that the half-trailer is capable of being angularly shifted, whereby the system including the tractor and the half-trailer may follow any predetermined curve. Such pivotal connections may be also designed in a manner such that the component parts of the coupling, to wit: the tractor and the half-trailer, may not be subjected to any parasitic stress and, in particularly, to any twisting stress.

The connecting rods may be fitted either directly on the tractor and on the half-trailer, or else, on intermediate members connected permanently or transiently with the tractor or with the half-trailer.

The connecting members or the pivotal connections of the connecting rods may be designed so as to allow an easy disengagement between the half-trailer and the tractor.

What I claim is:

1. In a vehicle of the type having a half-trailer coupled to a tractor, and wherein the half-trailer is provided with a single axle and the tractor is provided with a pair of spaced axles, the provision of means coupling the half-trailer to the tractor such that the weight of the half-trailer is distributed in part to the axle of the half-trailer and in part to both axles of the tractor, the weight distributed to the axles of the tractor having a resultant which lies between said axles, said means comprising: a pair of connecting rods, each connecting rod including first and second portions, means connecting said portions of each rod together in axially aligned relation while permitting relative rotation therebetween, means connecting one of the portions of one of the rods to the trailer for angular movement about mutually perpendicular axes, means connecting the other of the portions of said one rod to the tractor for angular movement about mutually perpendicular axes which are respectively parallel to the first said axes, means connecting one of the portions of the other rod to the tractor for angular movement about mutually perpendicular axes, one of which axes corresponds to an axis of angular movement of the said one rod about the tractor and means for connecting the other of the portions of the other rod to the trailer for angular movement about only a single axis, the latter axis being parallel to one of the axes about which said one rod is angularly movable relative to the trailer, said latter axis being located on the other of said axes about which said one rod is angularly movable relative to the trailer, all of said means which connect respective rods to the trailer and tractor being arranged to maintain the rods in substantially constant relative angular relationship in which axially extending lines from said rods intersect at a location between the axles of the tractor.

2. A vehicle of the type having a half trailer coupled to a tractor, and wherein the half-trailer is provided with a single axle and the tractor is provided with a pair of spaced axles, the provision of means coupling the half-trailer to the tractor such that the weight of the half-trailer is distributed in part to the axle of the half-trailer and in part to both axles of the tractor, the weight distributed to the axles of the tractor having a resultant which lies between said axles, said means comprising: a pair of connecting rods lying one above the other in a vertical plane, each connecting rod including first and second portions and means connecting said portions together in axially aligned relation while permitting relative rotation therebetween, whereby each said rod constitutes an axially extending element adapted to transfer axial load while being unable to transfer torsional load, means for each of the rods connecting one of the portions of a respective rod to the tractor for angular movement about substantially vertical and horizontal transverse axes and wherein the vertical axes are coincident, means connecting the other portion of the upper rod to the trailer for angular movement about vertical and horizontal axes and means lying on the last said vertical axis connecting the other portion of the lower rod and the trailer for angular movement about a horizontal axis, said rods being supported by the respective means in converging relationship and wherein axially extending lines from the rods converge at a location between the axles of the tractor.

References Cited in the file of this patent

UNITED STATES PATENTS

| | | |
|---|---|---|
| 2,828,142 | Hamblin | Mar. 25, 1958 |
| 2,899,004 | Simmons | Aug. 11, 1959 |

FOREIGN PATENTS

| | | |
|---|---|---|
| 113,398 | Australia | July 1, 1941 |